[12] United States Patent
Yoo et al.

(10) Patent No.: US 10,638,431 B2
(45) Date of Patent: Apr. 28, 2020

(54) POWER CONTROL FOR COORDINATED MULTIPOINT JOINT TRANSMISSION

(71) Applicant: QUALCOMM Incorporated, San Diego, CA (US)

(72) Inventors: Taesang Yoo, San Diego, CA (US); Xiaoxia Zhang, San Diego, CA (US); Aleksandar Damnjanovic, Del Mar, CA (US); Juan Montojo, San Diego, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/874,595

(22) Filed: Jan. 18, 2018

(65) Prior Publication Data

US 2018/0213486 A1 Jul. 26, 2018

Related U.S. Application Data

(60) Provisional application No. 62/448,940, filed on Jan. 20, 2017.

(51) Int. Cl.
H04W 52/24 (2009.01)
H04W 72/04 (2009.01)
(Continued)

(52) U.S. Cl.
CPC ....... H04W 52/241 (2013.01); H04W 52/146 (2013.01); H04W 52/16 (2013.01);
(Continued)

(58) Field of Classification Search
CPC . H04W 52/146; H04W 52/16; H04W 52/241; H04W 52/248; H04W 52/42; H04W 52/48; H04W 52/58; H04W 72/0413; H04W 72/14; H04W 88/02; H04W 88/08; H04W 72/042;
(Continued)

(56) References Cited

U.S. PATENT DOCUMENTS

2014/0029522 A1* 1/2014 Farmanbar ............ H04L 5/0035
370/329
2014/0161093 A1* 6/2014 Hoshino ................ H04B 7/024
370/329
(Continued)

FOREIGN PATENT DOCUMENTS

WO 2009075548 A1 6/2009

OTHER PUBLICATIONS

International Search Report and Written Opinion—PCT/US2018/014339—ISA/EPO—dated Aug. 29, 2018.

Primary Examiner — Philip Sobutka
(74) Attorney, Agent, or Firm — Patterson + Sheridan, L.L.P.

(57) ABSTRACT

Certain aspects of the present disclosure relate to methods and apparatus for power control in coordinated multipoint (CoMP) scenarios that utilize joint transmission (JT). For example, a method for power control at a base station, may include receiving an indication, from at least one of a plurality of paired UEs served by a set of base stations using a common set of time/frequency resources, of a parameter relating to an uplink reference signal used for transmitting an uplink reference signal.

30 Claims, 16 Drawing Sheets

(51) Int. Cl.
*H04W 72/14* (2009.01)
*H04W 52/14* (2009.01)
*H04W 52/42* (2009.01)
*H04W 52/16* (2009.01)
*H04L 5/00* (2006.01)
*H04W 88/08* (2009.01)
*H04W 88/02* (2009.01)
*H04W 52/58* (2009.01)
*H04W 52/48* (2009.01)

(52) U.S. Cl.
CPC ....... *H04W 52/247* (2013.01); *H04W 52/248* (2013.01); *H04W 52/42* (2013.01); *H04W 72/0413* (2013.01); *H04W 72/14* (2013.01); *H04L 5/0048* (2013.01); *H04L 5/0053* (2013.01); *H04L 5/0094* (2013.01); *H04W 52/48* (2013.01); *H04W 52/58* (2013.01); *H04W 88/02* (2013.01); *H04W 88/08* (2013.01)

(58) Field of Classification Search
CPC ............. H04W 52/325; H04W 52/346; H04W 52/242; H04W 52/343; H04W 52/265; H04W 52/281; H04W 52/34; H04W 72/04; H04L 5/0048
USPC .......................................................... 455/522
See application file for complete search history.

(56) References Cited

U.S. PATENT DOCUMENTS

| | | | | |
|---|---|---|---|---|
| 2014/0179363 | A1* | 6/2014 | Nishikawa | H04L 27/2614 455/522 |
| 2014/0314000 | A1* | 10/2014 | Liu | H04W 72/042 370/329 |
| 2015/0016317 | A1* | 1/2015 | Park | H04W 52/146 370/280 |
| 2015/0223178 | A1* | 8/2015 | Pietraski | H04L 5/001 370/252 |
| 2015/0341914 | A1 | 11/2015 | Lee et al. | |

* cited by examiner

POWER CONTROL FOR COORDINATED MULTIPOINT JOINT TRANSMISSION

CLAIM OF PRIORITY UNDER 35 U.S.C. § 119

The present application for patent claims benefit of U.S. Provisional Patent Application Ser. No. 62/448,940, filed Jan. 20, 2017, assigned to the assignee hereof and hereby expressly incorporated by reference herein.

BACKGROUND

Field of the Disclosure

The present disclosure relates generally to communication systems, and more particularly, to methods and apparatus for power control for coordinated multipoint joint transmission in communications systems operating according to new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station. The method generally includes determining an absolute transmit power level for transmissions from a plurality of paired UEs served by a set of base stations using a common set of time/frequency resources, generating a transmit power control (TPC) command for at least one of the UEs based on the absolute transmit power level, and transmitting the TPC COMMAND to the at least one UE.

Certain aspects provide a method for wireless communication by a user equipment. The method generally includes receiving signaling, from at least one of a set of base stations serving a plurality of paired UEs using a common set of time/frequency resources, indicating whether the UE is to apply a transmit power control (TPC) command to uplink reference signals, a physical uplink shared channel (PUSCH), or both, receiving the TPC COMMAND from one or more of the set of base stations, and applying the TPC command in accordance with the signaling.

Certain aspects provide a method for wireless communication by a base station. The method generally includes generating a transmit power control (TPC) command for at least one UE of a plurality of paired UEs served by a set of base stations using a common set of time/frequency resources, transmitting the TPC COMMAND to the at least one UE via a physical downlink shared channel (PDSCH), and monitoring a physical uplink control channel (PUCCH) for an acknowledgement of the TPC command.

Certain aspects provide a method for wireless communication by a user equipment. The method generally includes receiving, from at least one of a set of base stations serving a plurality of paired UEs using a common set of time/ frequency resources, a transmit power control (TPC) COMMAND via a physical downlink shared channel (PDSCH), and sending an acknowledgement of the TPC command via a physical uplink control channel (PUCCH).

Certain aspects provide a method for wireless communication by a base station. The method generally includes receiving an indication, from at least one of a plurality of paired UEs served by a set of base stations using a common set of time/frequency resources, of a transmit power level used for transmitting an uplink reference signal, generating a transmit power control (TPC) command for the at least one UE based on the indication, and transmitting the TPC COMMAND to the at least one UE.

Certain aspects provide a method for wireless communication by a user equipment. The method generally includes transmitting an uplink reference signal, and sending an indication, to at least one of a set of base stations serving a plurality of paired UEs using a common set of time/frequency resources, of a transmit power level used by the UE for transmitting the uplink reference signal.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
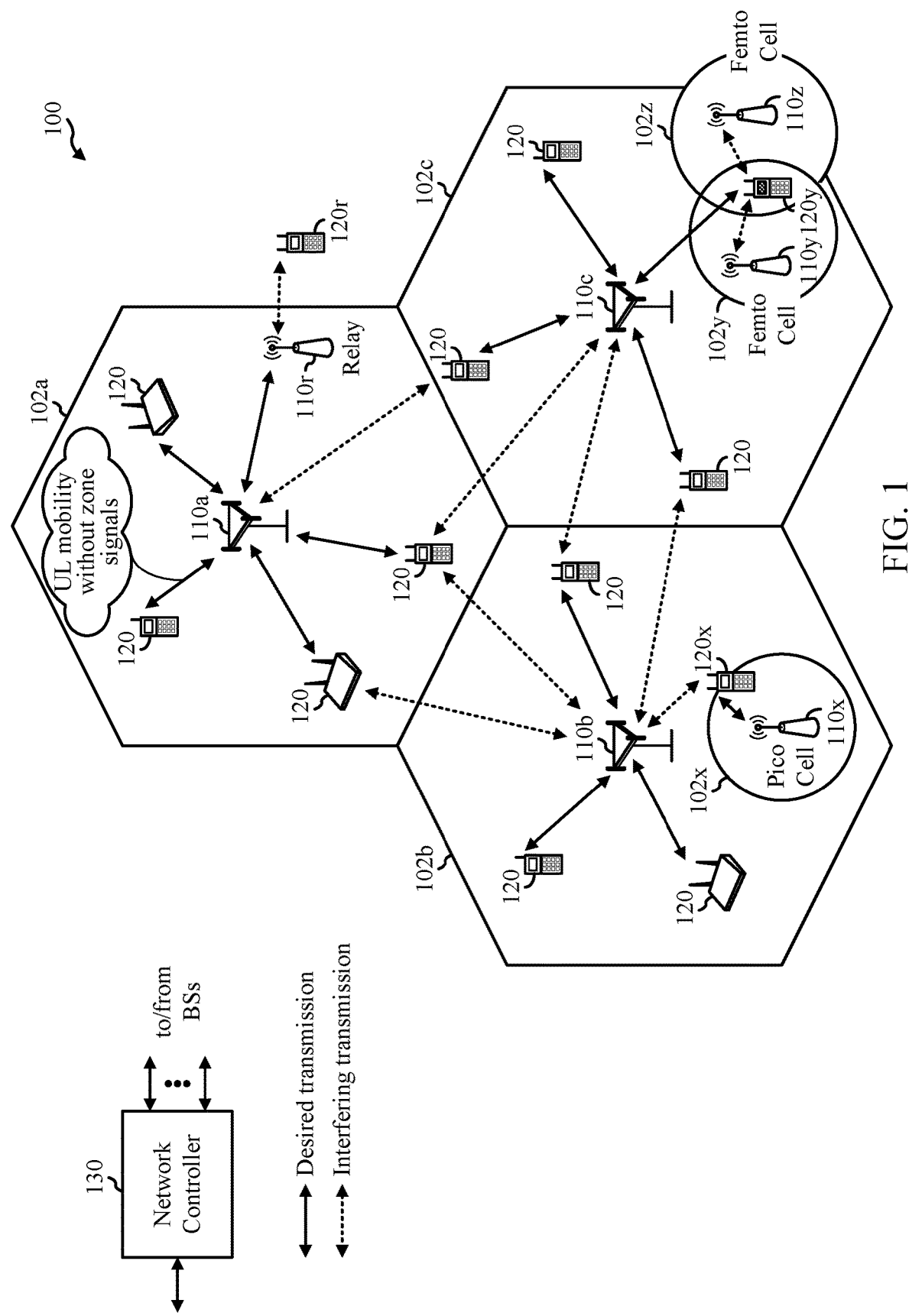
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to transmitting sounding reference signals (SRS). According to aspects of the present disclosure, a network (e.g., a network entity, such as a BS) may decide and communicate to a UE which one of cyclic prefix orthogonal frequency domain multiplexing (CP-OFDM) and discrete Fourier transform spread orthogonal frequency domain multiplexing (DFT-S-OFDM) based waveforms the UE should use when transmitting (e.g., transmitting SRS) to the network. In one example, UEs support both CP-OFDM and DFT-S-OFDM based waveforms.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates possible transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
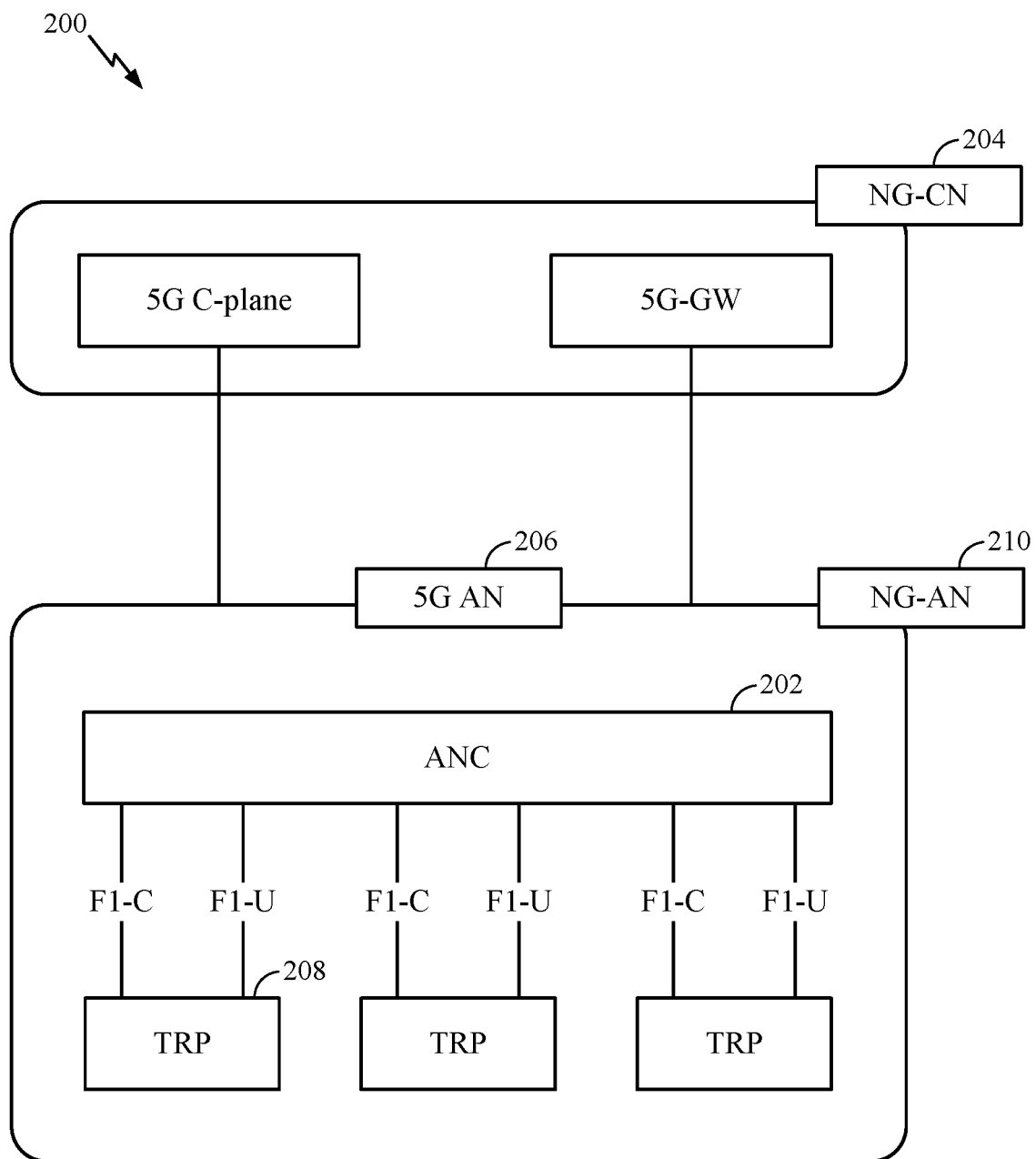
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC 202 may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
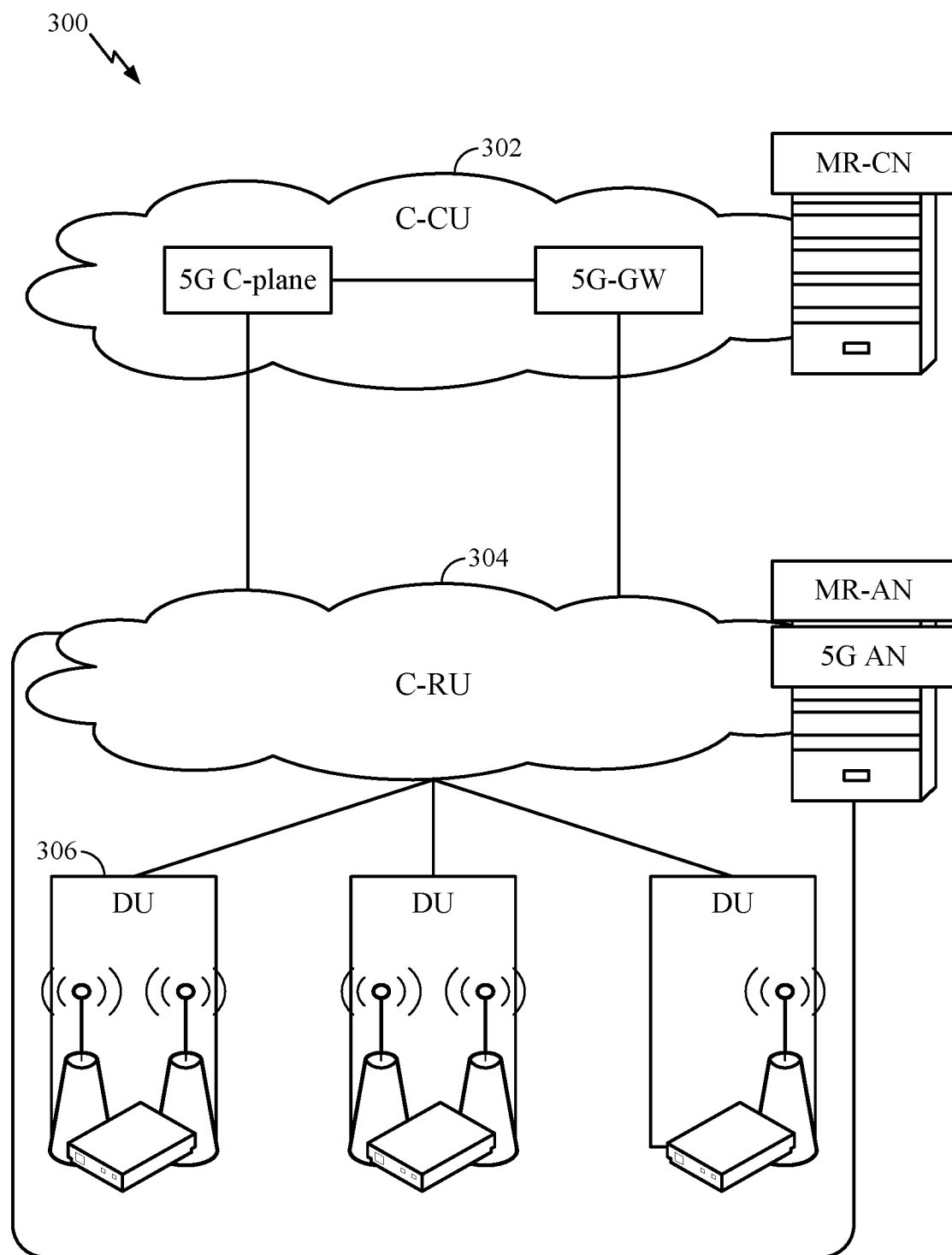
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
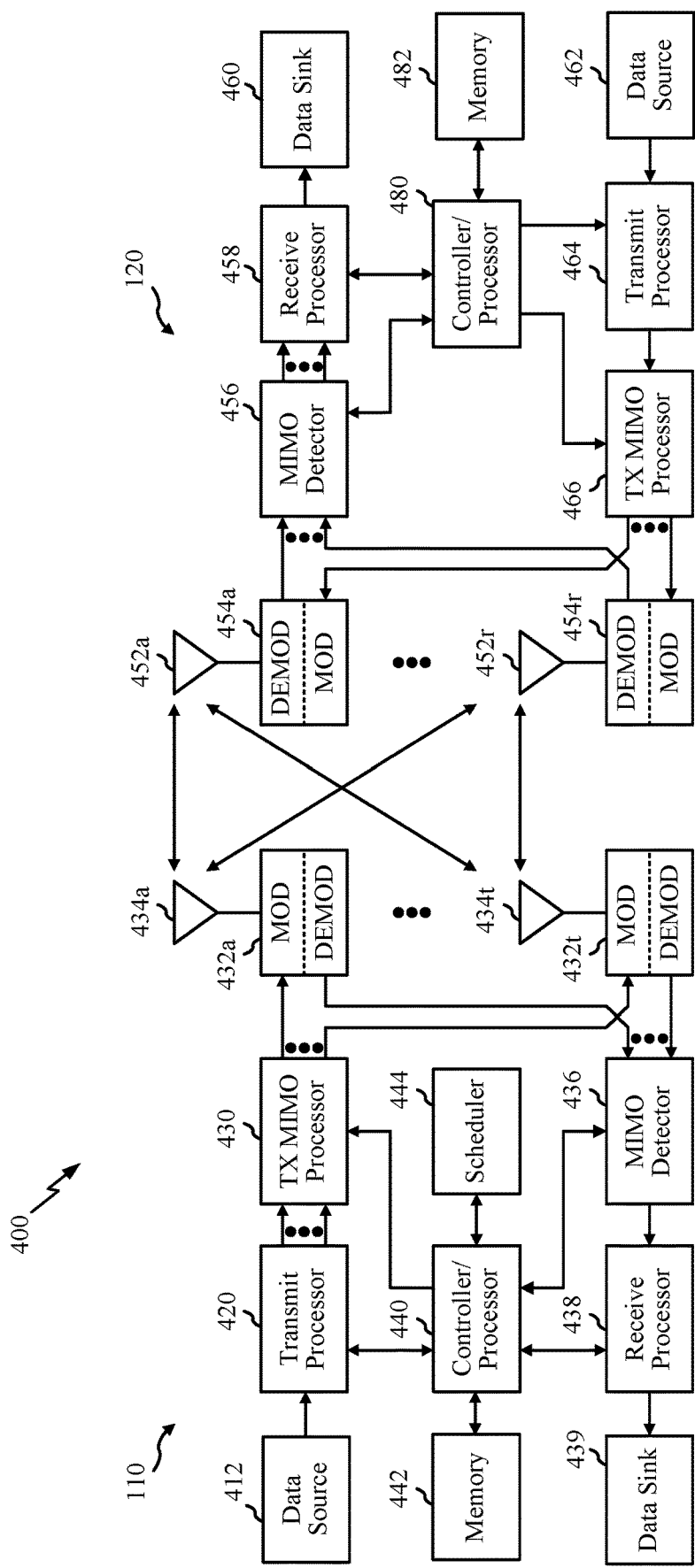
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 13, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
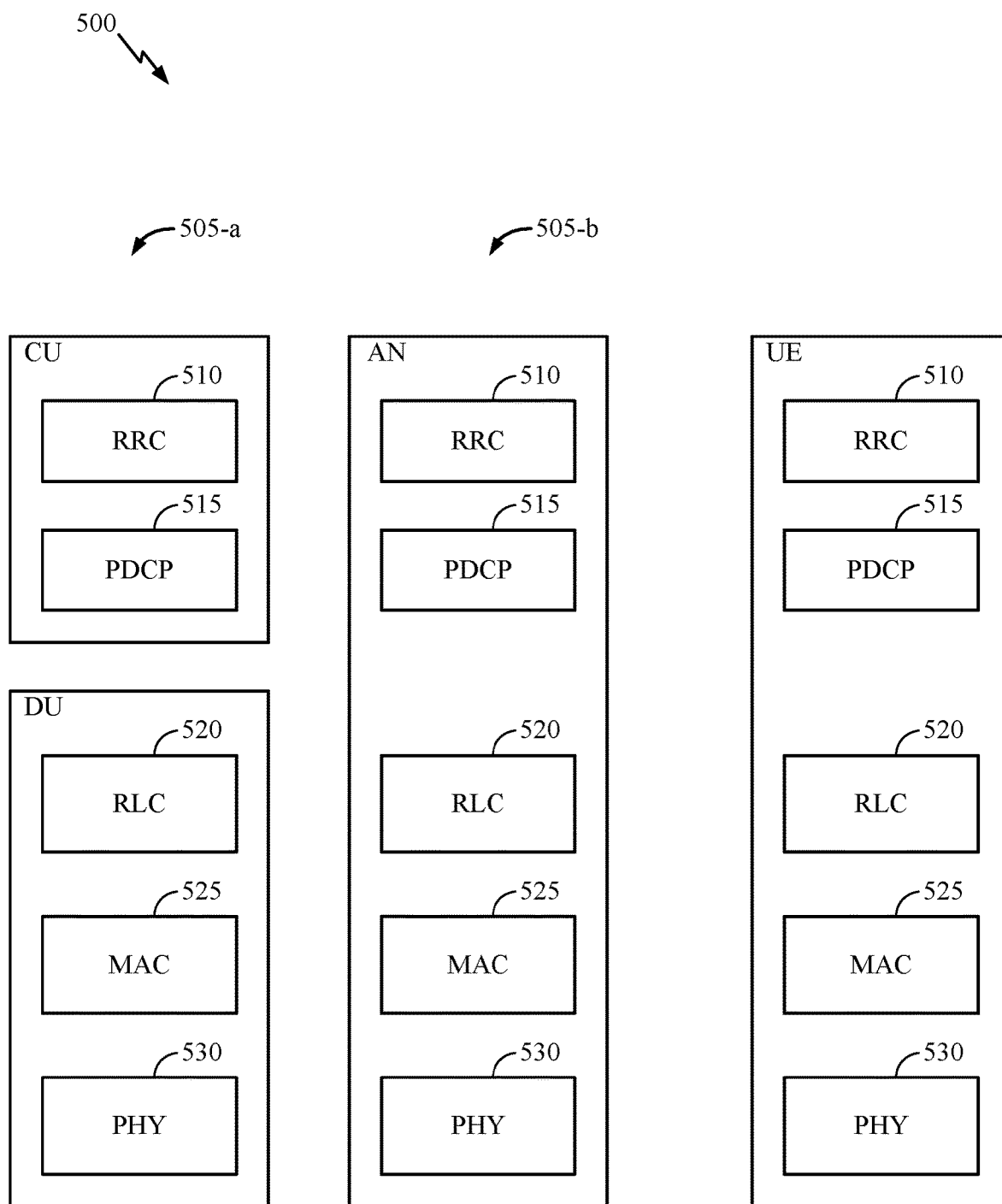
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
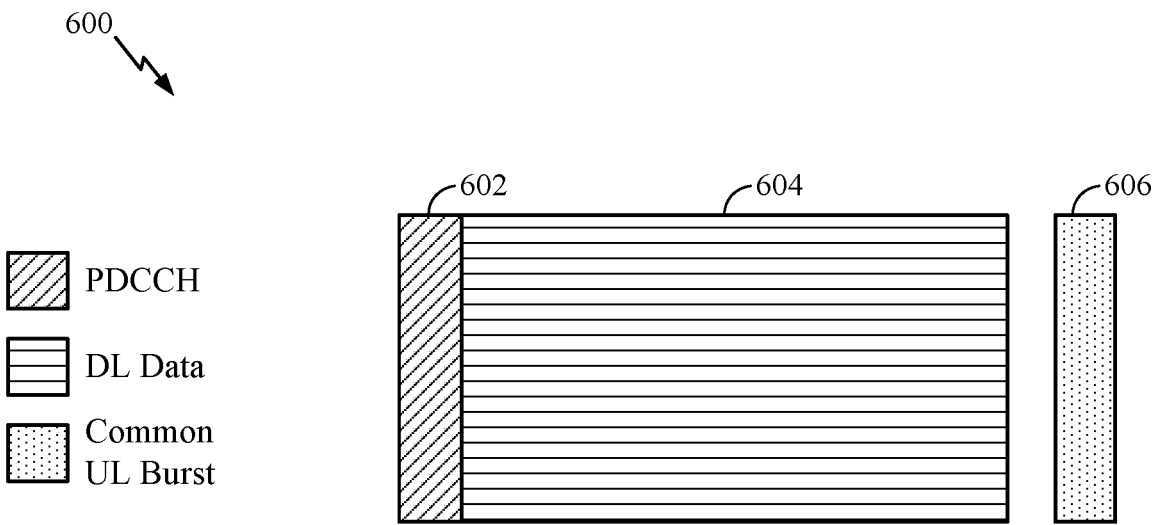
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
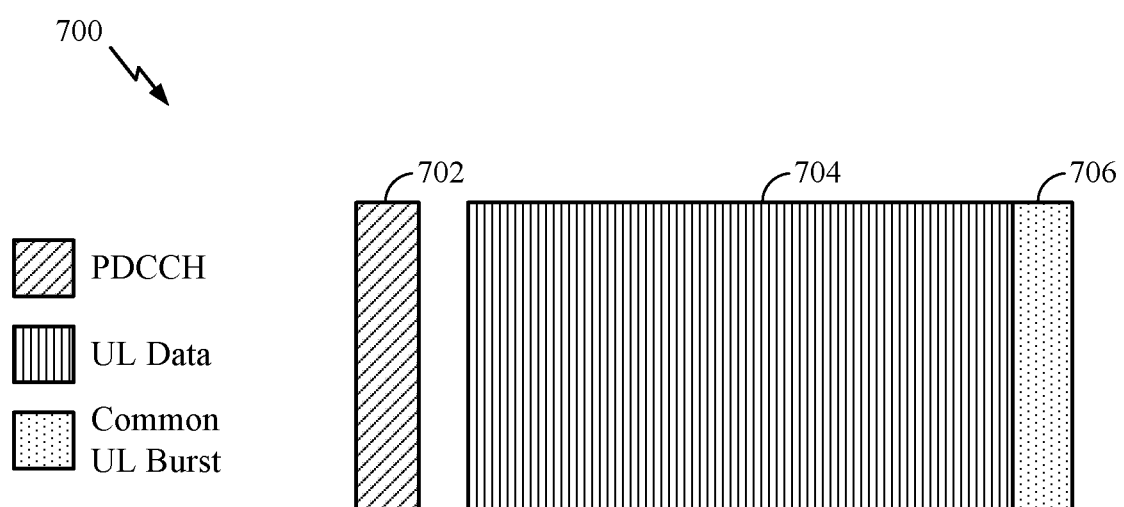
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Coordinated Multipoint

According to aspects, and as will be described in more detail herein, multiple base stations (BSs) (e.g., Node Bs, TRPs, APs) of a wireless network may communicate with a UE using a downlink strategy called joint processing. Further, in coordinated multipoint (CoMP) communication, multiple Node BSs may be geographically separated and may coordinate to create beams, where each beam may be transmitted from the multiple BSs to a UE. The BSs, which may be referred to as a cluster of BSs, may also participate in the joint processing for downlink and uplink communication to a UE.

A CoMP scheduler may facilitate joint processing by the multiple BSs of the cluster to a UE. The CoMP scheduler may be part of one of the BSs within the cluster. Additionally or alternatively, the CoMP scheduler may be separate from the BSs of the cluster. The CoMP scheduler may communicate with one or more BSs of the cluster. Further, the CoMP scheduler may be part of multiple BSs in the cluster of BSs and/or may be part of a separate entity such as, for example, a network controller. The CoMP scheduler may be configured to perform the operations discussed in more detail below.

The wireless network may also support coverage that may be enhanced by coordinated multipoint (CoMP) transmission. For CoMP, multiple transmission points (e.g., BSs and/or UEs) may coordinate to better serve a UE on a downlink and/or uplink. For example, transmission points may coordinate to reduce interference (e.g., with some transmission points restricting transmission during times others are to transmit). Multiple transmission points may also transmit simultaneously to achieve higher transmit power. Similarly, multiple transmission points may coordinate to serve a UE separately or simultaneously on the uplink.

CoMP may be supported via certain transmission modes. For example, in LTE Release 11, CoMP may be supported in down link (DL) transmission mode. In this case, a UE may be configured with multiple channel state information (CSI) processes, and may provide separate CSI feedback for each CSI process. Each CSI process may involve one non-zero-power (NZP) channel state information reference signal (CSI-RS) configuration used for channel measurement and one interference measurement resource (IMR) configuration (e.g., derived from zero-power (ZP) CSI-RS configuration) used for interference measurement.

Each CSI process may be viewed as being associated with one or more cells of the multiple cells involved in CoMP operation for the UE. A UE may also be dynamically indicated with a set of parameters for PDSCH rate matching and a NZP CSI-RS configuration for Quasi-co-location (QCL) operation (e.g., with DM-RS and/or CRS).

According to one or more aspects, instead of, or in addition to CSI feedback, CoMP may be realized via utilizing channel reciprocity. Reciprocity describes the ability for a station to use information (such as a multipath delay profile) from one channel (e.g., the UL) in making determinations regarding another channel (e.g., the DL). In time-division duplexing (TDD) systems, the physical UL channel and the physical DL channel are identical because UL and DL operate in the same frequency band. For example, BSs may compute UL channel estimates based on SRSs transmitted by UEs and use the UL channel estimates for DL beamforming. In practice, calibration may be implemented to achieve accurate reciprocity.

According to one or more aspects, the base stations may use the uplink channel estimates obtained via SRS for determining spatial equalization parameters for processing UL CoMP reception. The base station may further obtain downlink channel estimates via SRS by utilizing channel reciprocity, and the downlink channel estimates may be used to determine beamforming weights for DL CoMP transmission.

Generally, CoMP provides a framework for downlink and uplink cooperative transmissions involving multiple, non-collocated BSs. According to one example, CoMP may refer to a downlink strategy called joint processing (JT), where multiple geographically separated BSs coordinate to create beams, wherein each beam may be transmitted from each of the multiple geographically separated BSs to serve a UE. Joint processing (JT) may involve centralized processing at a central BS and fiber connections to other coordinating BSs serving the UE. Joint processing (JT) may be thought of as a massive MIMO system with geographically distributed Node BSs.

Example Power Control for Coordinated Multipoint Joint Transmission

Coordinated multipoint joint transmission (CoMP-JT) may pose stringent and unique transmission scenarios that may predicate implementation of one or more power control options for such transmissions. For example, when UEs jointly transmit in a CoMP-JT scenario, a strong uplink signal from a UE may mask a weaker uplink signal from another UE, degrading the signal quality of the weak signal and hurting performance. The same thing may happen when multiple UEs transmit SRS for reception at multiple BSs. Specifically, a similar scenario may occur for power control for uplink transmission. This scenario may include both PUCCH and PUSCH transmitted through UL CoMP. Further, this scenario may also include (uplink) SRS transmission that is used for channel estimation for DL/UL CoMP.

For transmission from a single gNB not implementing CoMP-JT, it may be sufficient to perform power control among UEs served within the single gNB's communication range such that the received power levels from the UEs are equalized for the single gNB. However, in a scenario where multiple gNBs service a group of UEs, the selected power levels that may provide one gNB equalized power levels may not do so for the other gNBs located at a different positions from the one single gNB.

For uplink CoMP-JT, and for uplink SRS for channel sounding for downlink/uplink CoMP-JT, signals may be received from multiple gNBs. As a result, power control may be performed jointly taking into account received power levels at each of the gNBs from each of the UEs. Accordingly, an optimal power control is a function of which UEs are paired with the gNBs. Therefore, according to one or more examples, rather than a single "optimal" power level for a given UE, an optimal power level for a UE depends on which other UEs are paired for CoMP. This "absolute" power control based on the paired UEs may be implemented in place, or in conjunction with, a power up/down loop.

According to one or more examples, power control options for CoMP-JT are provided that may provide proper power control that may be helpful for CoMP-JT performance. According to a specific example, finite Error Vector Magnitude (EVM) of a receiver chain may also be considered when providing power control.

Coordinated Multipoint (CoMP) is a general framework for downlink (DL) and uplink (UL) cooperative transmission involving multiple non-collocated gNBs. CoMP may include a variety of cooperation techniques ranging from semi-static scheduler coordination to transmit beamforming and interference nulling across multiple network nodes.

Joint transmission (JT) is a particular CoMP strategy where multiple geographically separated gNBs coordinate to support transmission to, and receptions from, multiple UEs on the same time/frequency resources. In practice, CoMP-JT may use centralized processing at a central gNB and fiber connections to other coordinating gNBs. In effect, this arrangement may be like a large MIMO system with geographically distributed gNBs and UEs.

In one or more cases, a cluster of gNBs may be provided that serve a set of UEs simultaneously. A channel matrix may be provided that comprises entries that represent the channel from a gNB in the cluster to a UE of the set and many, if not all, combinations thereof. For example the matrix may be represented as follows:

$$\begin{bmatrix} H_{1,1} & H_{1,2} & \cdots & H_{1,c} & \cdots \\ H_{2,1} & H_{2,2} & \cdots & H_{2,c} & \cdots \\ \vdots & \vdots & \vdots & \vdots & \vdots \\ \vdots & \vdots & \ddots & \ddots & \cdots \\ H_{u,1} & H_{u,2} & \cdots & H_{u,c} & \cdots \\ \vdots & \vdots & \vdots & \vdots & \vdots \end{bmatrix}$$

Further, as an example, the beams to, and/or from, the set of UEs may be determined to maximize the signal to noise ratio (S/NR) using an algorithm such as, for example, the following:

$$W_{:,u} = \arg\max_{\|w\|^2 = P_s} \frac{|H_{u,:}w|^2}{1 + \sum_{u' \neq u} |H_{u',:}w|^2}$$

This algorithm may use accurate channel knowledge to provide accurate beam pointing. More precisely, the accurate channel knowledge provides for beam nulling toward unintended UEs using the above algorithm for example.

Figure 8:
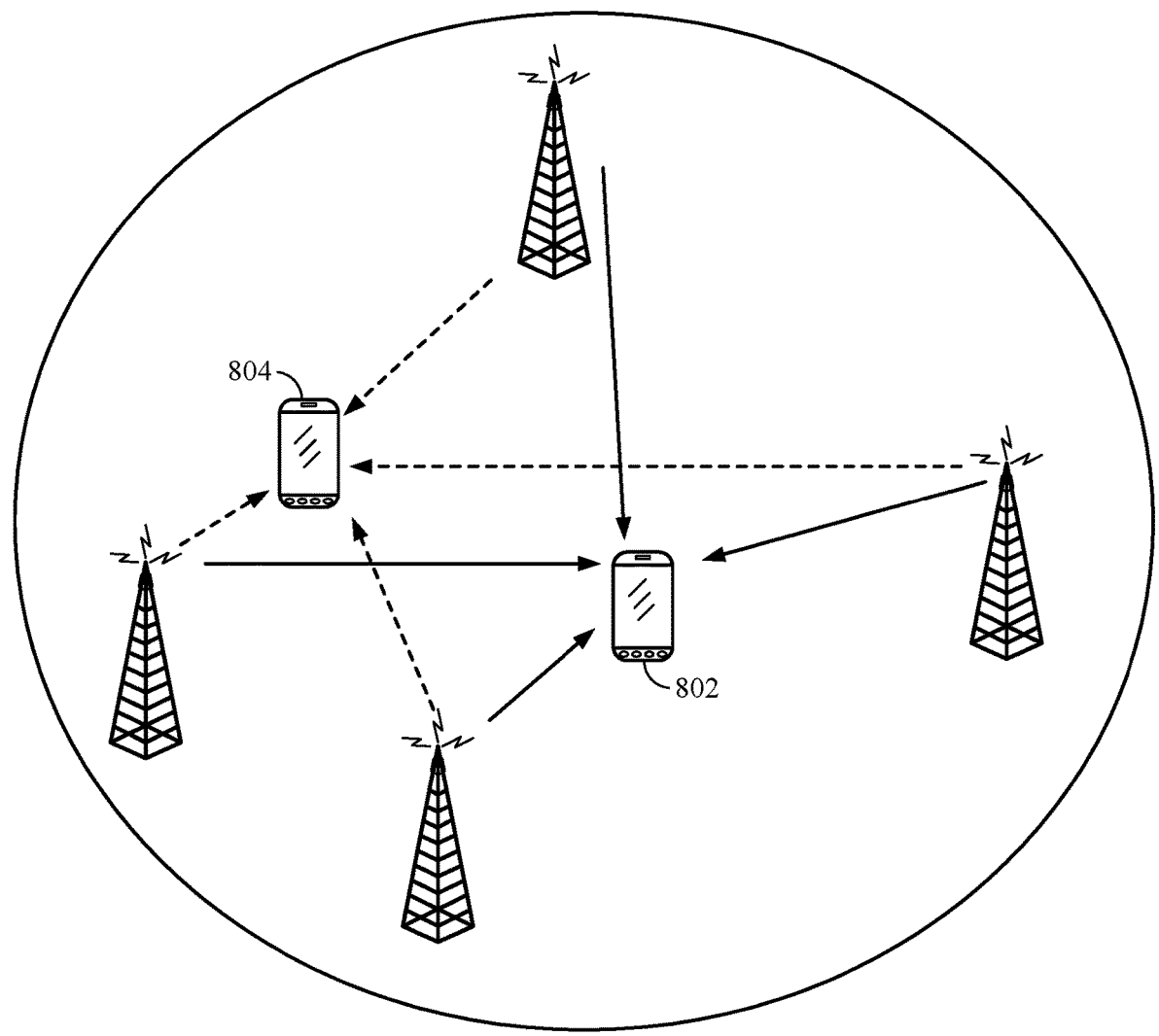
FIG. 8 illustrates an example Coordinated Multipoint (CoMP) scenario, in which aspects of the present disclosure may be practiced.

Thus, as shown in FIG. 8, for DL CoMP, only an intended UE 802 may see the signal, because the net signal toward unintended UEs 804 is very small as the signals from multiple gNBs are constructed such that the signals cancel out at unintended UEs 804.

Channel reciprocity is a concept that is used to implement one or more aspects of the disclosure. Further, in time-division duplexing (TDD) systems, the uplink and downlink transmissions may take place over the same frequency band. Hence, if the transmissions are performed within the channel coherence time, the uplink and downlink channel values may be identical. As a result, the downlink channel to each user may be estimated in the uplink direction through the transmission of sounding reference signals (SRS) from the user equipment (UEs), and may be used in the design of downlink beams. Instead of the network (NW) asking the UE to feedback (or report) DL channel conditions, the NW may request an SRS transmission from the UE. Based on the SRS which may be used to determine UL channel quality, the NW, due to the reciprocity, knows the quality of the DL channel may be the same as the UL channel. Thus, the NW may use the SRS to figure out the CoMP beamforming, e.g., derive the CoMP beamforming coefficients for DL CoMP.

This channel reciprocity concept may be combined with CoMP-JT to provide reciprocity-based CoMP-JT. Reciprocity-based CoMP-JT may include high density SRS feedback. The SRS feedback may be used to derive CoMP beamforming coefficients (for DL CoMP-JT). Additionally, the SRS feedback may also be used to derive MMSE equalization coefficients (for UL CoMP-JT).

Figure 9A:
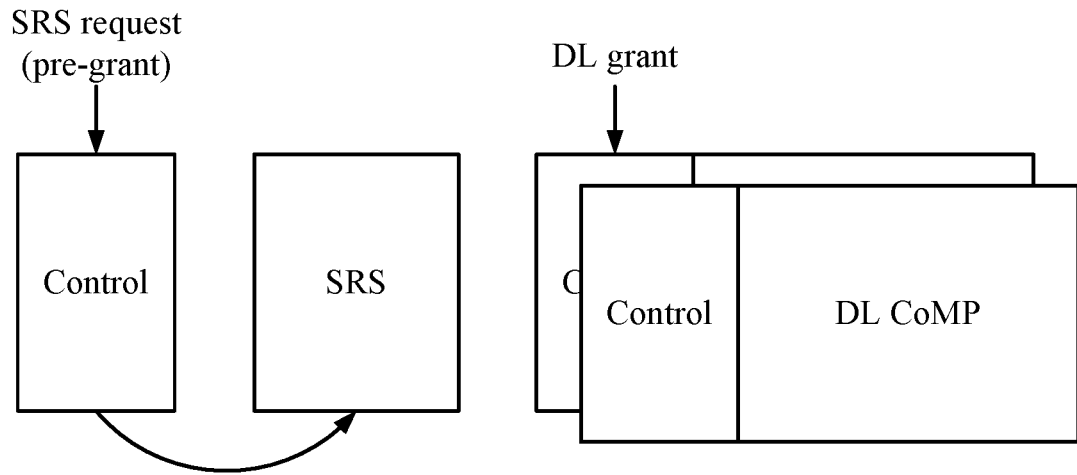
FIGS. 9A and 9B illustrate example signals that may be transmitted with transmit power control, in accordance with aspects of the present disclosure.
Figure 9B:
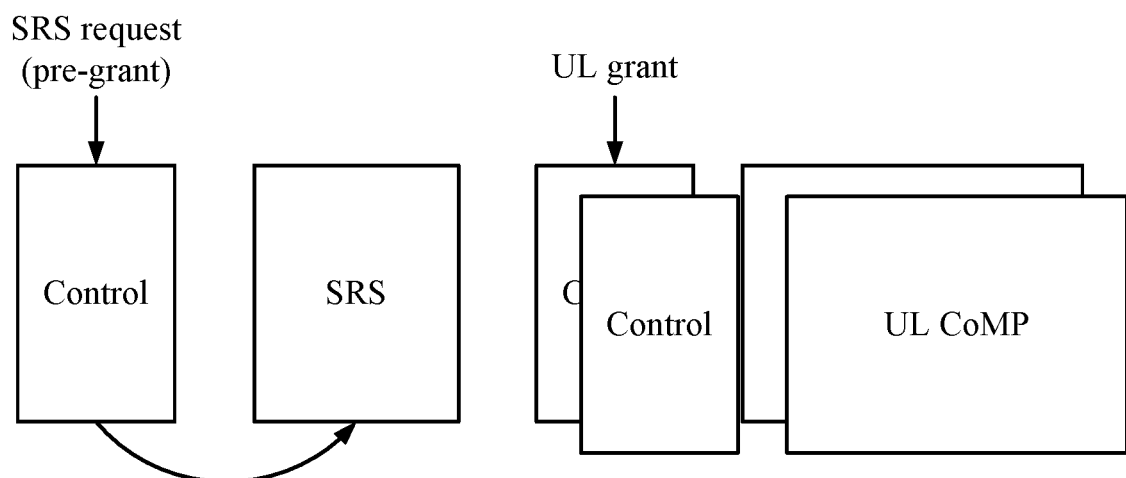

As shown in FIGS. 9A and 9B, a gNB selects a set of UEs and requests SRS feedback, which may be referred to as a "pre-grant." The UE responds with the SRS feedback. Based on the SRS feedback, the eNB makes CoMP scheduling decisions, which may include one or more of an uplink scheduling decision or a downlink scheduling decision. Some CoMP scheduling decisions that can be made may include one or more of selecting UE pairing, rank, beam direction, and a Modulation/Coding Scheme (MCS).

Looking now at FIG. 9A specifically, for DL CoMP-JT, Demodulation reference signal (DMRS) and physical downlink shared channel (PDSCH) may be beamformed via CoMP. Further, according to a specific example, DMRS/

PDSCH of the paired UEs may be overlaid on the same time/frequency resources. Both control channels and data channels may be beamformed using CoMP.

Further, looking now at FIG. 9B, for UL CoMP-JT, DMRS and physical uplink shared channel (PUSCH) may be spatially separated via CoMP. According to a specific example, DMRS/PUSCH of the paired UEs may be overlaid on the same time/frequency resources.

As noted above, CoMP-JT can pose stringent and unique transmission scenarios that may predicate implementation of one or more power control options. For example, as specifically shown in FIG. 10B, when UEs jointly transmit in a CoMP-JT scenario, a strong uplink signal from a UE1 may mask a weaker uplink signal from another UE2, degrading the signal quality of the weak signal and hurting performance.

Figure 10A:
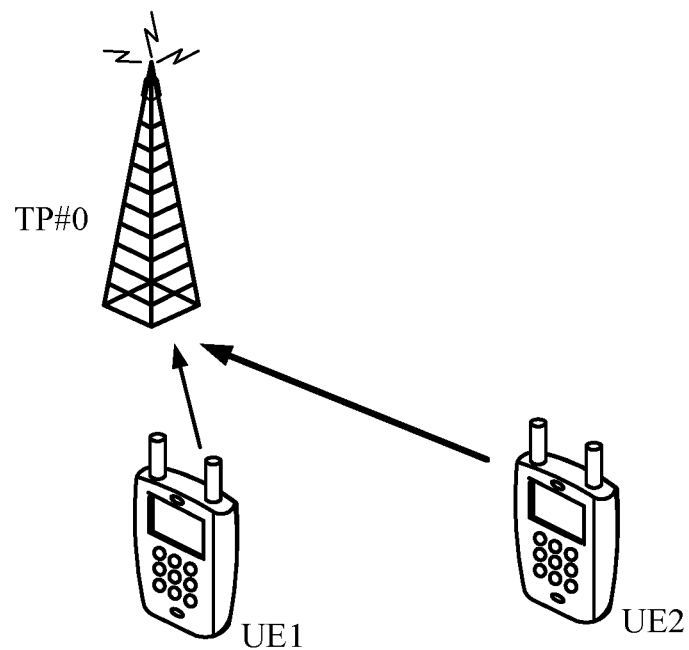
FIGS. 10A and 10B illustrate example joint transmission (JT) CoMP scenarios, in which aspects of the present disclosure may be practiced.

As shown in FIG. 10A for non-CoMP scenario, it may be sufficient to do power control among UEs (UE1 and UE2) served within gNB (TP#0) such that the received power levels from UEs are equalized. For a non-CoMP setup, optimal power for a UE depends on the path loss. In this scenario, the optimal uplink power level for a UE1 and/or UE2 may not change significantly over time in either an open loop and/or a closed loop power control that uses an up/down command. If the UE doesn't move, its optimal power level may not change much.

Figure 10B:
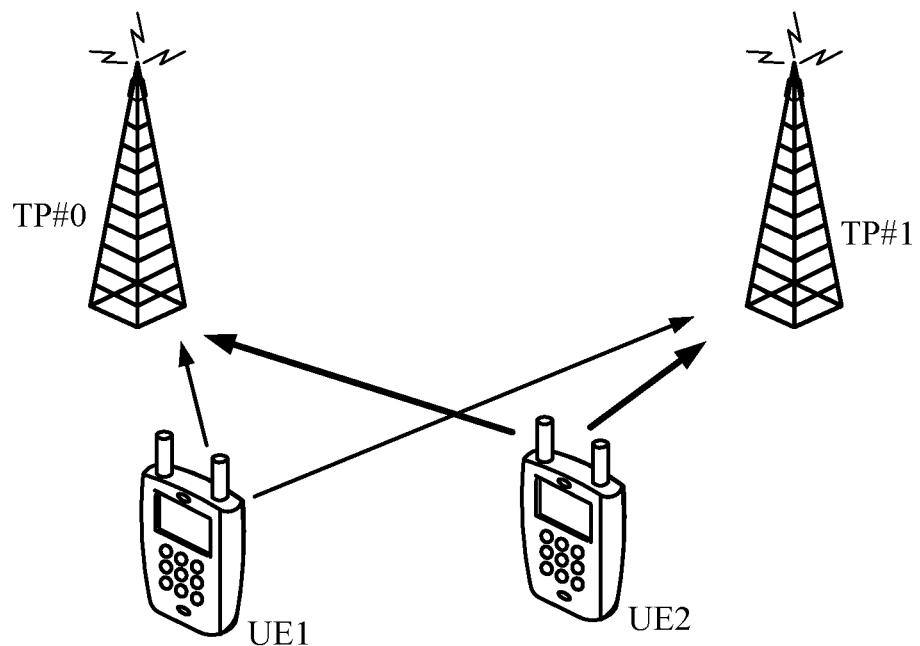

In contrast, for a CoMP scenario as shown in FIG. 10B, signals may be received from multiple UEs at multiple gNBs. As a result, power control may be performed jointly taking into consideration received powers at each of the gNBs (TP#0 and TP#1) from each of the UEs (UE1 and UE2). Accordingly, the optimal power control is a function of which UEs are paired to the gNBs. It can be appreciated that there may not be a single "optimal" power level for a given UE. Rather, an optimal power level for a UE depends on which other UEs are paired for CoMP. For example, the optimal power level for UE1 when paired with UE2 may be different from the optimal power level for UE1 when paired with UE3. Therefore, there is no single optimal power level for a UE, and this lack of a single optimal power level may make the UE unsuitable to do the conventional closed loop power control targeting a single optimal power level. Motivated by this, according to an example, an "absolute" power control instead of, or in conjunction with, a power up/down loop is used to implement power control.

Figure 11:
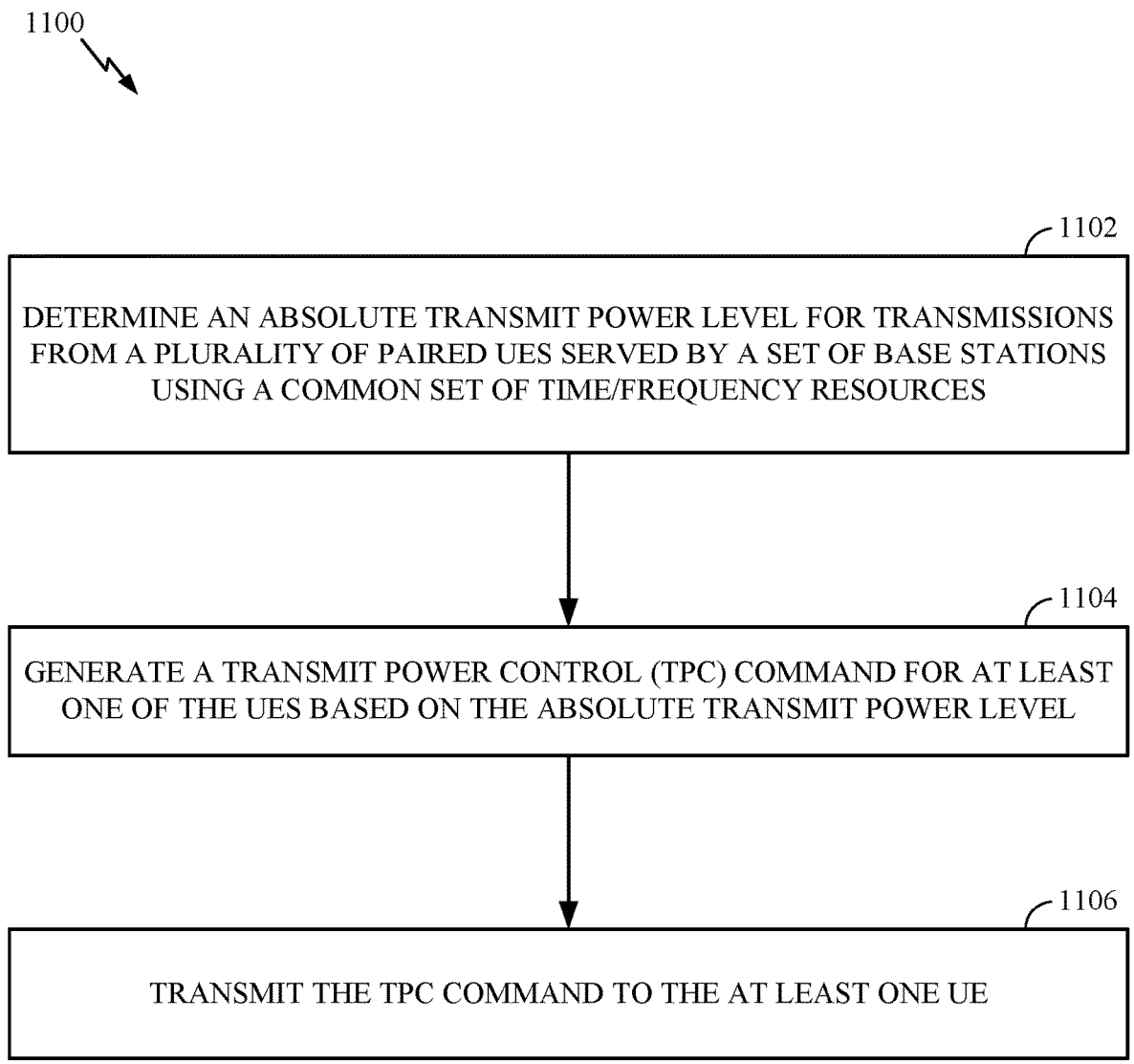
FIG. 11 example operations for wireless communications by a base station, in accordance with aspects of the present disclosure.

FIG. 11 illustrates example operations 1100 for wireless communications, according to aspects of the present disclosure. Operations 1100 may be performed by a base station (e.g., a gNB). Operations 1100 begin, at block 1102, with the base station determining an absolute transmit power level for transmissions from a plurality of paired UEs served by a set of base stations using a common set of time/frequency resources. Operations 1100 further includes, at block 1104, the base station generating a transmit power control (TPC) command for at least one of the UEs based on the absolute transmit power level, and at block 1106, transmitting the TPC command to the at least one UE.

Additionally, other elements can be provided in one or more cases. For example, the set of base stations may jointly transmit to the paired UEs using the common set of time/frequency resources. In some cases, the base station may receive feedback from the UEs regarding a transmit power level of the reference signals, and the TPC command may be generated based also on the feedback. According to an aspect, the absolute transmit power level may be determined based on one or more parameters indicative of signal strength received from one or more of the paired UEs.

Another operation that may be included is signaling whether the TPC command is to be applied to uplink reference signals (e.g., SRS), a physical uplink shared channel (PUSCH), or both. Such signaling can be provided via at least one of a downlink grant or an uplink grant or a separate downlink control information (DCI).

In one or more cases, the TPC command may indicate a relative transmit power level of a physical uplink channel with respect to an uplink reference signal. In some cases, the absolute transmit power level is determined based, at least in part, on acknowledgements of TPC commands by the paired UEs. Additionally, the TPC commands may be transmitted via physical downlink shared channels (PDSCH) transmissions, and the acknowledgements may be received via physical uplink control channel (PUCCH) transmissions.

Figure 12:
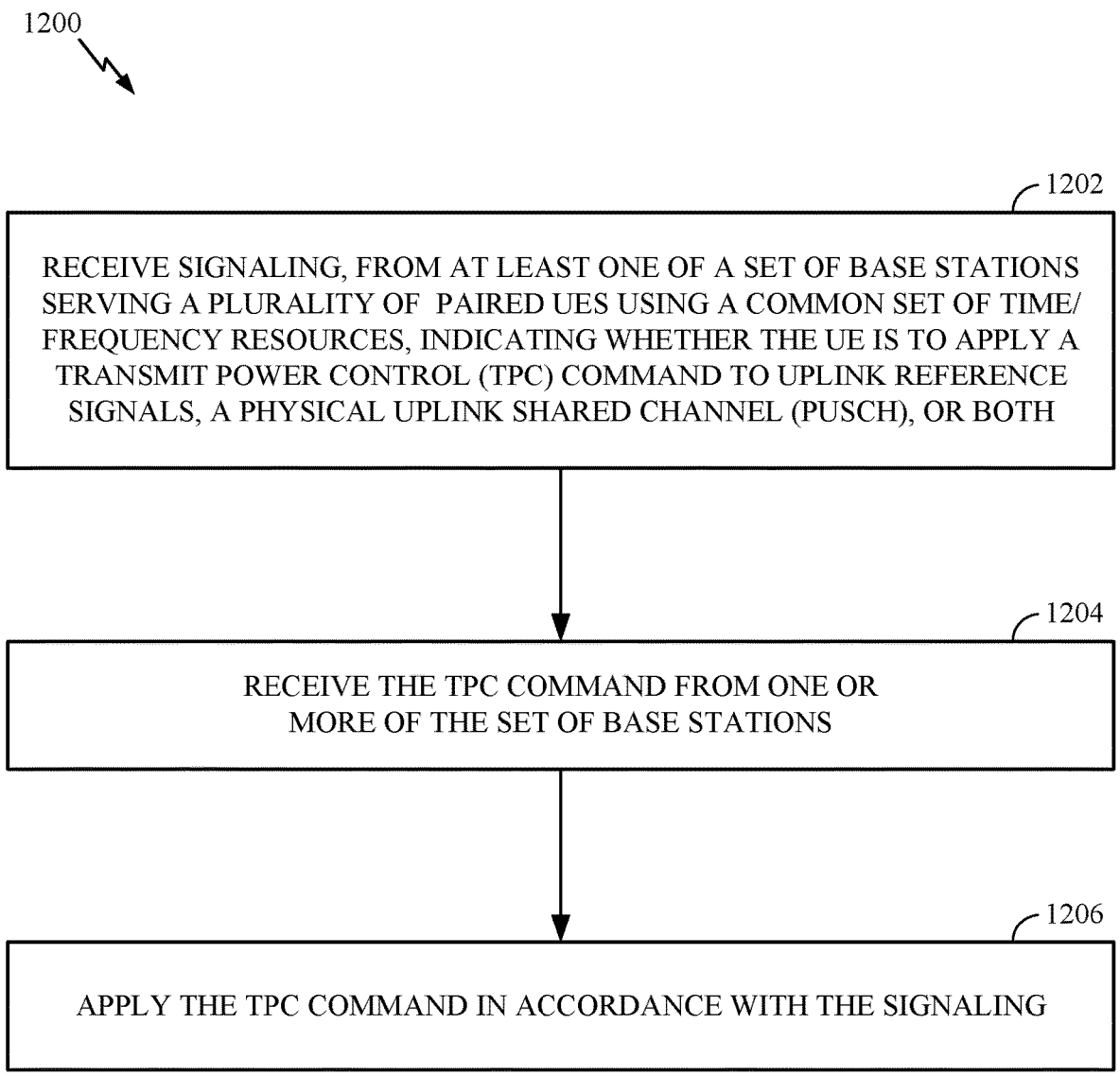
FIG. 12 example operations for wireless communications by a user equipment, in accordance with aspects of the present disclosure.

FIG. 12 illustrates example operations 1200 for wireless communications, according to aspects of the present disclosure. Operations 1200 may be performed by a user equipment (UE). Operations 1200 begin, at block 1202, with the UE receiving signaling, from at least one of a set of base stations serving a plurality of paired UEs using a common set of time/frequency resources, indicating whether the UE is to apply a transmit power control (TPC) command to uplink reference signals, a physical uplink shared channel (PUSCH), or both. The operations 1200 also include, at block 1203, the UE receiving the TPC COMMAND from one or more of the set of base stations, and at block 1206, operations 1200 includes the UE applying the TPC command in accordance with the signaling.

Figure 13A:
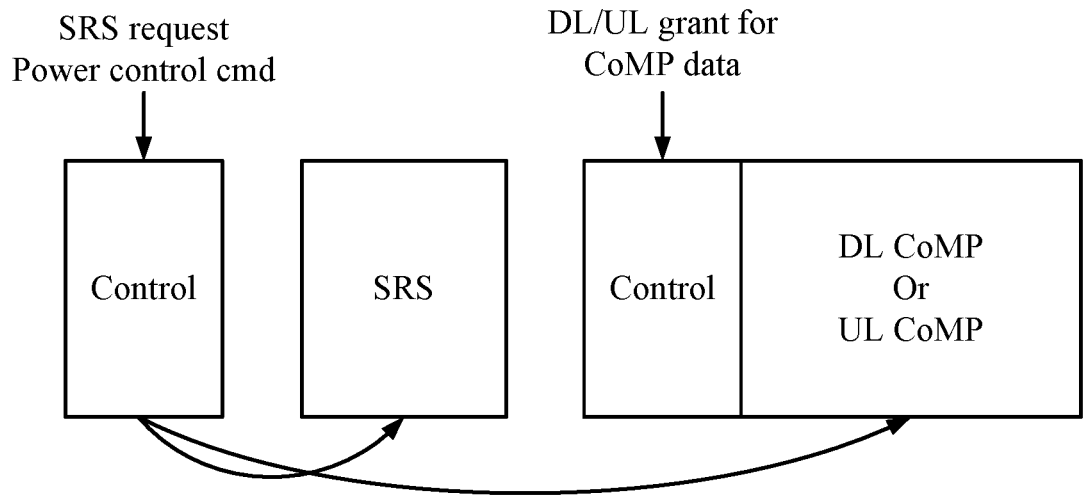
FIGS. 13A and 13B illustrate how TPC commands may be applied, in accordance with aspects of the present disclosure.

According to aspects of the present disclosure, a one-shot power control on an SRS request may be provided. Specifically, a power control value may be indicated in the SRS request that is transmitted by the base station to UEs. According to an aspect of the present disclosure, the power control command may indicate an absolute power level of SRS. According to another aspect of the present disclosure, the power control command may comprise cumulative power control for SRS (an LTE approach). Further, as shown in FIG. 13A, the power control may be applied either on SRS alone, or on both SRS and one or both of PUSCH and PUCCH.

Figure 13B:
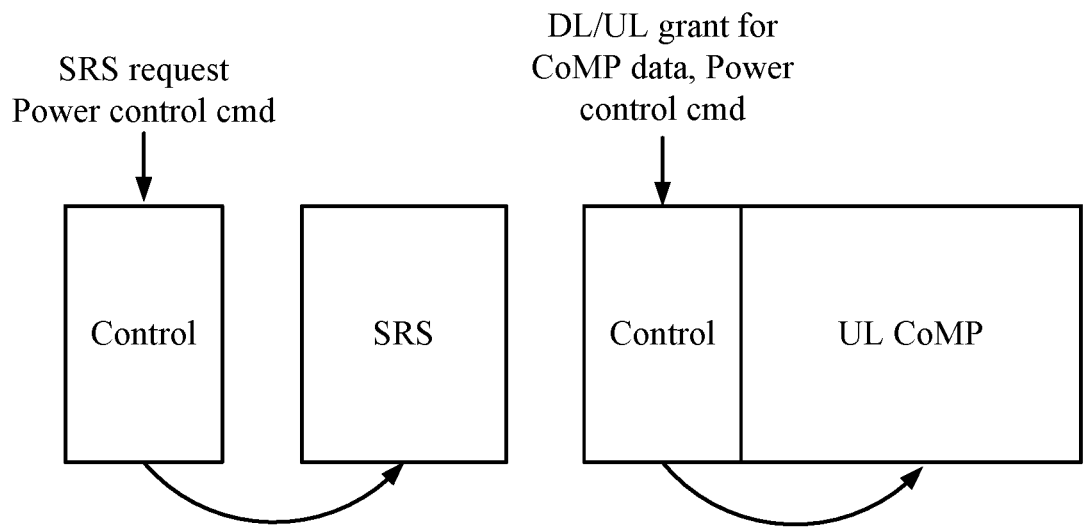

In conjunction with the above, as shown in FIG. 13B, either one-shot power control and/or closed loop power up/down power control may be indicated on DL/UL grant for CoMP-based PUCCH/PUSCH. According to an aspect of the present disclosure, the power control command may indicate an absolute power level of PUSCH/PUCCH. According to another aspect of the present disclosure, the power control command may comprise cumulative power control for PUSCH/PUCCH (an LTE approach). According to another aspect of the present disclosure, the power control command may comprise an absolute value indicating a relative power level of PUSCH/PUCCH with respect to SRS. According to another aspect of the present disclosure, the power control command may comprise cumulative power control for a relative power level of PUSCH/PUCCH w.r.t. SRS.

According to an aspect of the present disclosure, an gNB may derive the optimal UE power level based on one or more of Reference Signal Received Quality (RSRP), Channel Quality Indicator (CQI), and/or other information available, of one or more of the UEs jointly scheduled via CoMP.

Figure 14:
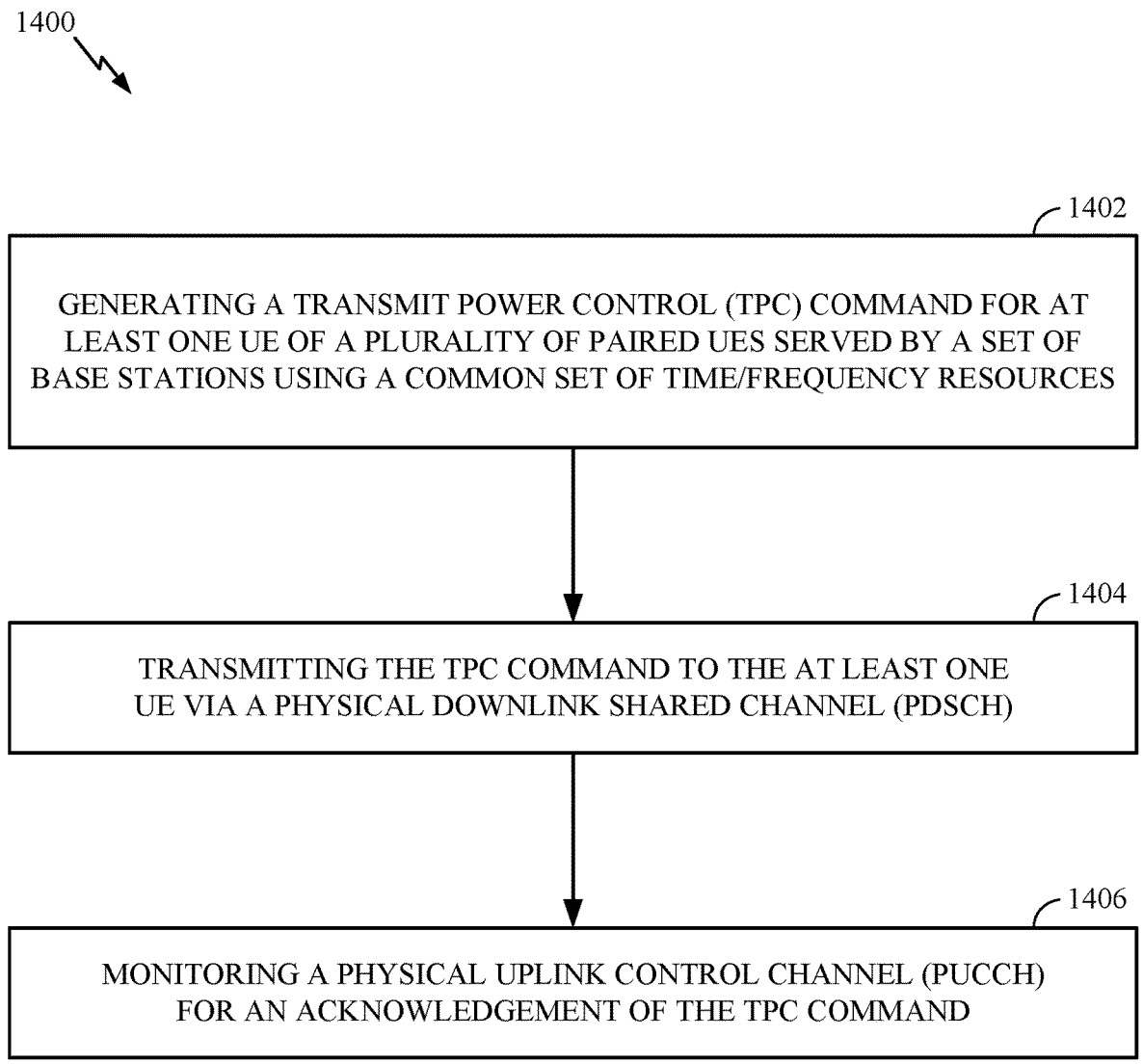
FIG. 14 example operations for wireless communications by a base station, in accordance with aspects of the present disclosure.

FIG. 14 illustrates example operations 1400 for wireless communications, according to aspects of the present disclosure. Operations 1400 may be performed by a gNB. Operations 1400 begin, at block 1402, with the gNB generating a transmit power control (TPC) command for at least one UE of a plurality of paired UEs served by a set of base stations using a common set of time/frequency resources. Operations 1400 continue, at block 1404, with the gNB transmitting the TPC COMMAND to the at least one UE via a physical downlink shared channel (PDSCH). Operations 1400 conclude, at block 1406, with the gNB monitoring a physical uplink control channel (PUCCH) for an acknowledgement of the TPC command.

Additionally, other elements can be provided in one or more cases. For example, updating an absolute transmit power level of the paired UEs based on whether or not the acknowledgement is received can be included. In some cases, the set of base stations jointly transmit to the paired UEs using the common set of time/frequency resources. Signaling whether the TPC command is to be applied to uplink reference signals, a physical uplink shared channel (PUSCH), or both can also be included in some cases. According to one or more aspects, the TPC command may indicate a relative transmit power level of a physical uplink channel with respect to an uplink reference signal.

Figure 15:
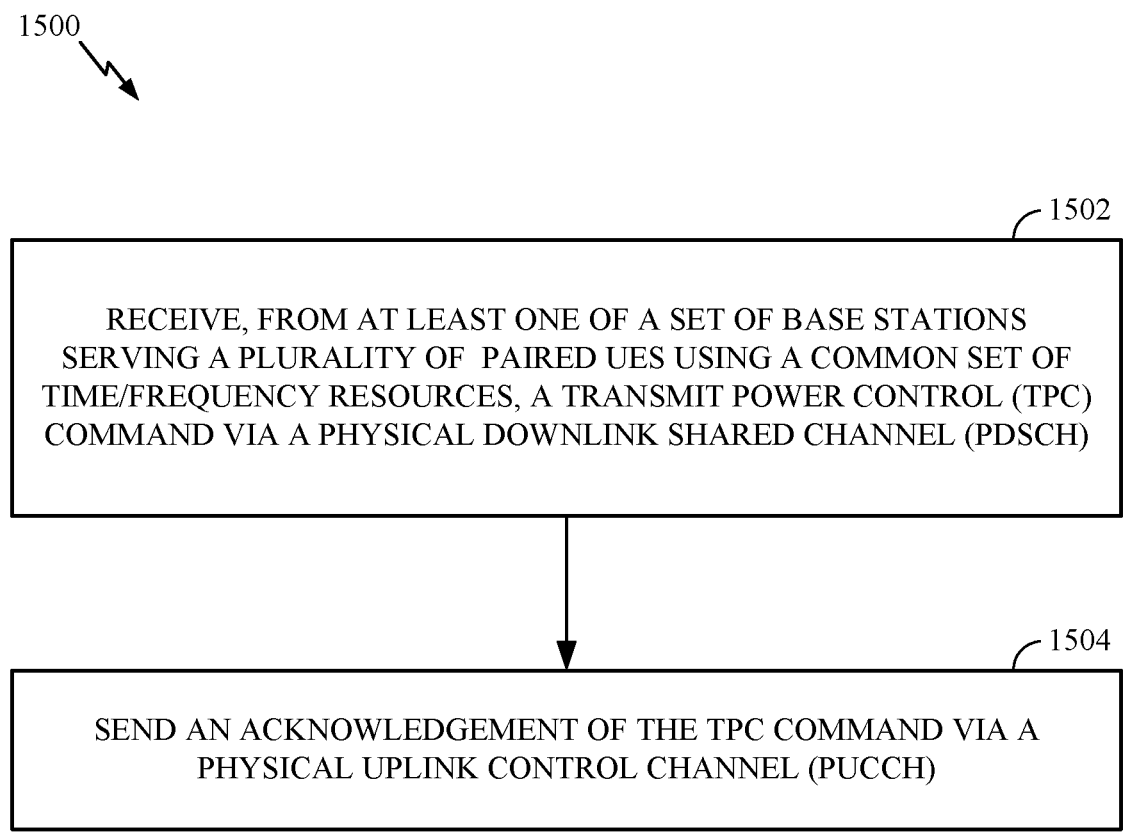
FIG. 15 example operations for wireless communications by a user equipment, in accordance with aspects of the present disclosure.

FIG. 15 illustrates example operations 1500 for wireless communications, according to aspects of the present disclosure. Operations 1500 may be performed by a UE. Operations 1500 begin, at block 1502, with the UE receiving, from at least one of a set of base stations serving a plurality of paired UEs using a common set of time/frequency resources, a transmit power control (TPC) COMMAND via a physical downlink shared channel (PDSCH). Operations 1500 continue, at block 1504, with the UE sending an acknowledgement of the TPC command via a physical uplink control channel (PUCCH).

In one or more cases, the power control command may be transmitted over PDSCH and acknowledged by the UE via the regular ACK/NACK on PUCCH. According to an aspect of the present disclosure, the power control command may be used for SRS. According to another aspect of the present disclosure, the power control command may be used for CoMP-based PUCCH and/or PUSCH. For example, according to another aspect of the present disclosure, the power control command may indicate an absolute power level of SRS and PUSCH/PUCCH, individually or jointly. According to another aspect of the present disclosure, the power control command may comprise cumulative power control for SRS and PUSCH/PUCCH, individually or jointly. According to another aspect of the present disclosure, the power control command may comprise an absolute or cumulative power control for SRS, and an absolute value indicating a relative power level of PUSCH/PUCCH with respect to SRS. According to another aspect of the present disclosure, the power control command may comprise an absolute or cumulative power control for SRS, and a cumulative power control for a relative power level of PUSCH/PUCCH with respect to SRS.

Figure 16:
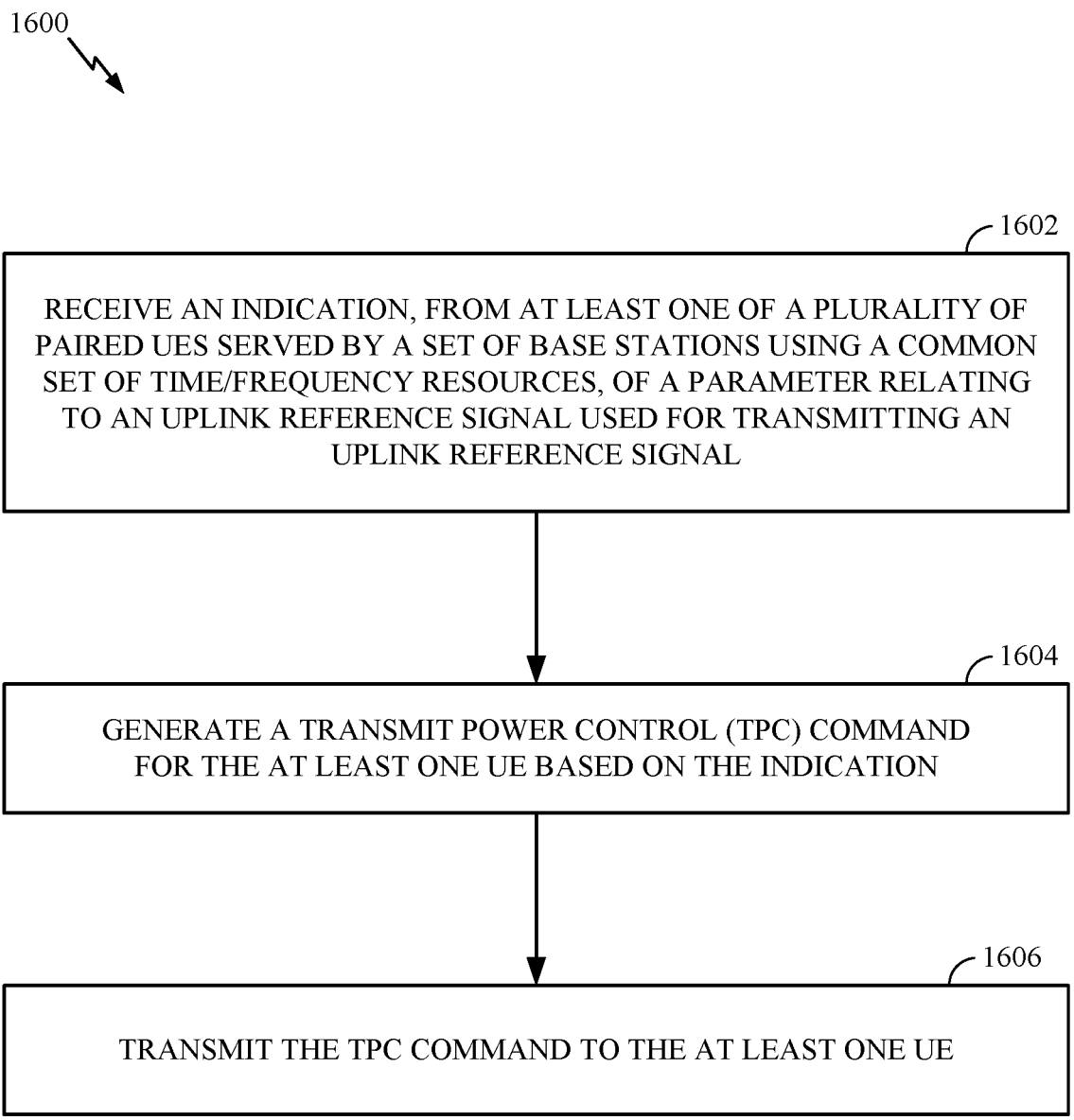
FIG. 16 example operations for wireless communications by a base station, in accordance with aspects of the present disclosure.

FIG. 16 illustrates example operations 1600 for wireless communications, according to aspects of the present disclosure. Operations 1600 may be performed by a gNB. Operations 1600 begin, at block 1602, with the gNB receiving an indication, from at least one of a plurality of paired UEs served by a set of base stations using a common set of time/frequency resources, of a parameter relating to an uplink reference signal used for transmitting an uplink reference signal. Operations 1600 continue, at block 1604, with the gNB generating a transmit power control (TPC) command for the at least one UE based on the indication. Operations 1600 conclude, at block 1606, with the gNB transmitting the TPC command to the at least one UE. Open loop power control refers to the mechanism where a UE determines its own Tx power based on downlink measurement without involving TPC commands from the gNB. In one or more cases, the parameter may comprise a transmit power level used for transmitting the uplink reference signal. In other cases, the parameter may comprise a signal-to-noise ratio (SNR) of a downlink reference signal. The SNR may be used to determine a transmit power level used for transmitting the uplink reference signal.

According to one or more aspects, the indication may be provided via at least one of a physical random access channel (PRACH), a physical uplink shared channel (PUSCH), or a physical uplink control channel (PUCCH). In some cases, the indication may be provided via a scrambling sequence used for transmitting an uplink reference signal. According to one or more aspects, gNB may generate uplink channel estimate by applying a scaling on the uplink reference signal according to the indicated transmit power level of the uplink reference signal. Further, in some cases, subsequent TPC commands may be generated based on the transmit power indication as in 1604.

Figure 17:
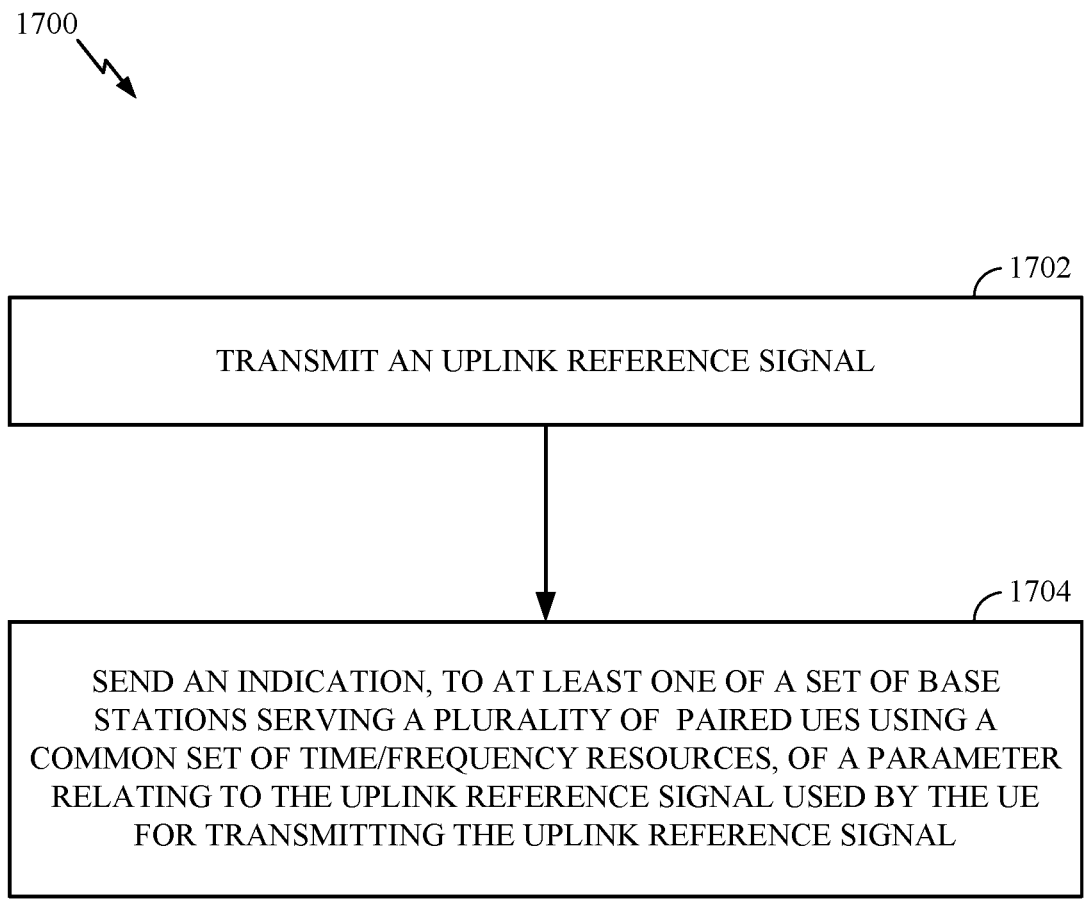
FIG. 17 example operations for wireless communications by a user equipment, in accordance with aspects of the present disclosure.

FIG. 17 illustrates example operations 1700 for wireless communications, according to aspects of the present disclosure. Operations 1700 may be performed by a UE. Operations 1700 begin, at block 1704, with the UE transmitting an uplink reference signal. Operations 1700 continue, at block 1706, with the UE sending an indication, to at least one of a set of base stations serving a plurality of paired UEs using a common set of time/frequency resources, of a parameter relating to the uplink reference signal used by the UE for transmitting the uplink reference signal. According to other cases, operation 1076 may happen before operation 1704 as there may be no strict ordering. That is, when requested, a UE may indicate the power level that the UE may have used for the uplink reference signal at the time of sending the indication. In one or more cases, the parameter may comprise a transmit power level used for transmitting the uplink reference signal. In other cases, the parameter may comprise a signal-to-noise ratio (SNR) of a downlink reference signal. The SNR may be used to determine a transmit power level used for transmitting the uplink reference signal.

According to an aspect of the disclosure, transmit (Tx) power reporting can be used in CoMP-JT scenarios. For example, for reciprocity-based CoMP, gNB requests to know the UE transmit power level on SRS. Once the gNB knows the UE transmit power level on SRS the gNB can translate the SRS received power into the channel estimate with the correct magnitude. According to an aspect of the disclosure, if an open loop power control is used, or if a closed loop power control is used that doesn't indicate the absolute power level, then the gNB can ask the UE to feed back the SRS power level.

According to an aspect of the disclosure, the open loop Tx power may be indicated via one or more of a PRACH, PUSCH, PUCCH, and scrambling sequence of SRS. According to another aspect of the disclosure, open loop or closed loop SRS Tx power may be indicated via scrambling sequence of SRS.

According to an aspect of the disclosure, a UE starts with the power based on open loop measurement. The UE can then indicate the power level to an gNB. The UE can do this indication using, for example, "Tx power reporting" as described above. Further, the gNB can have further closed loop up/down commands to adjust the power. According to another aspect of the disclosure, the close loop TPC command can have different step size compared to legacy closed loop. As described above, the closed loop TPC command may be conveyed in PDSCH and acknowledged by UE in PUCCH so that gNB may correctly track the uplink transmit power used by UE.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 11, 12, and 14-17.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for power control, comprising:
   identifying a plurality of paired UEs served by a set of base stations on a common set of time/frequency resources;
   determining an absolute transmit power level for transmissions from at least one UE in the plurality of paired UEs based at least in part on received power levels associated with transmissions from one or more other UEs in the plurality of paired UEs served by the set of base stations;
   generating a transmit power control (TPC) command for at least one of the UEs based on the absolute transmit power level; and
   transmitting the TPC command to the at least one UE.

2. The method of claim 1, wherein the method is performed at a network comprising multiple base stations, and the set of base stations jointly transmit to the plurality of paired UEs using the common set of time/frequency resources.

3. The method of claim 1, further comprising:
   receiving feedback from UEs in the plurality of paired UEs regarding an indication of a parameter relating to an uplink reference signal; and
   wherein the TPC command is generated based also on the feedback.

4. The method of claim 3, wherein the parameter comprises a transmit power level used for transmitting the uplink reference signal.

5. The method of claim 3, wherein the parameter comprises a signal-to-noise ratio (SNR) of a downlink reference signal, wherein the SNR is used to determine a transmit power level used for transmitting the uplink reference signal.

6. The method of claim 1, wherein determining the absolute transmit power level comprises determining the absolute transmit power level based on one or more parameters indicative of channel quality received from at least one of one or more of the plurality of paired UEs or from the set of base stations.

7. The method of claim 1, further comprising signaling whether the TPC command is to be applied to uplink reference signals, a physical uplink control channel (PUCCH), a physical uplink shared channel (PUSCH), or a combination thereof.

8. The method of claim 1, wherein transmitting the TPC command to the at least one UE comprises transmitting the TPC command to the at least one UE via at least one of a control channel message requesting an uplink reference signal transmission, a downlink grant, or an uplink grant.

9. The method of claim 1, wherein the TPC command indicates at least one of:

an absolute transmit power level of one or more of: an uplink reference signal, a physical uplink control channel (PUCCH), or a physical uplink shared channel (PUSCH), how much one or more of a transmit power of the uplink reference signal, a transmit power of the PUCCH, or a transmit power of the PUSCH is to be adjusted, one or more a relative transmit power level of the PUCCH or the PUCCH with respect to the uplink reference signal, or how much a relative transmit power level of one or more of the PUCCH or the PUSCH is to be adjusted with respect to the uplink reference signal.

10. A method for power control at a user equipment (UE), comprising:

receiving signaling, from at least one of a set of base stations serving a plurality of paired UEs using a common set of time/frequency resources, indicating whether the UE is to apply a transmit power control (TPC) command to uplink reference signals, a physical uplink shared channel (PUSCH), or a combination thereof;

receiving the TPC command from one or more of the set of base stations, wherein the TPC command is based at least in part on signals received from one or more other UEs in the plurality of paired UEs served by the set of base stations using the common set of time/frequency resources; and applying the TPC command to an uplink transmission in accordance with the signaling.

11. The method of claim 10, wherein the TPC command indicates:

an absolute transmit power level of one or more of the uplink reference signals, a physical uplink control channel (PUCCH), or the PUSCH, how much one or more of a transmit power of the uplink reference signals, a transmit power of the PUCCH, or a transmit power of the PUSCH is to be adjusted, one or more of a relative transmit power level of a physical uplink channel or the PUCCH with respect to the uplink reference signals, or how much a relative transmit power level of one or more of: the PUCCH, or the PUSCH is to be adjusted with respect to the uplink reference signals.

12. A method for power control at a base station, comprising:

identifying a plurality of paired UEs served by a set of base stations on a common set of time/frequency resources;

generating a transmit power control (TPC) command for at least one UE in the plurality of paired UEs, wherein the TPC command is based at least in part on received power levels associated with transmissions from other UEs in the plurality of paired UEs served by the set of base stations;

transmitting the TPC command to the at least one UE via a physical downlink shared channel (PDSCH); and monitoring a physical uplink control channel (PUCCH) for an acknowledgement of the TPC command.

13. The method of claim 12, further comprising generating subsequent TPC commands for the at least one UE in the plurality of paired UEs based on whether or not the acknowledgement is received.

14. The method of claim 12, wherein the set of base stations jointly transmit to the plurality of paired UEs using the common set of time/frequency resources.

15. The method of claim 12, further comprising signaling whether the TPC command is to be applied to one or more of uplink reference signals, the PUCCH, or a physical uplink shared channel (PUSCH).

16. The method of claim 12, wherein the TPC command indicates:

an absolute transmit power level of one or more of an uplink reference signal, the PUCCH, or a physical uplink shared channel (PUSCH), how much one or more of a transmit power of the uplink reference signal, a transmit power of the PUCCH, or a transmit power of the PUSCH is to be adjusted, one or more of a relative transmit power level of the PUCCH or the PUCCH with respect to the uplink reference signal, or how much a relative transmit power level of one or more of the PUCCH, the PUSCH is to be adjusted with respect to the uplink reference signal.

17. An apparatus for power control, comprising:

a processing system configured to:

determine an absolute transmit power level for transmissions from a plurality of paired UEs served by a set of base stations using a common set of time/frequency resources; and generate a transmit power control (TPC) command for at least one of the UEs in the plurality of paired UEs based on the absolute transmit power level, wherein the TPC command is based at least in part on received power levels associated with transmissions from one or more other UEs in the plurality of paired UEs served by the set of base stations;

and a transmitter configured to:

transmit the TPC command to the at least one UE.

18. The apparatus of claim 17, further comprising:

a receiver configured to:

receive feedback from one or more of the plurality of paired UEs regarding an indication of a parameter relating to an uplink reference signal; and wherein the processing system is further configured to generate the TPC command based also on the feedback.

19. The apparatus of claim 18, wherein the parameter comprises at least one of a transmit power level used for transmitting the uplink reference signal, or a signal-to-noise ratio (SNR) of a downlink reference signal, wherein the processing system is configured to use the SNR to determine a transmit power level used for transmitting the uplink reference signal.

20. The apparatus of claim 17, wherein the processing system is configured to determine absolute transmit power level is based on one or more parameters indicative of channel quality received from at least one of one or more of the plurality of paired UEs or from the set of base stations.

21. The apparatus of claim 17, wherein the processing system is further configured to signal whether the TPC command is to be applied to uplink reference signals, a physical uplink control channel (PUCCH), a physical uplink shared channel (PUSCH), or a combination thereof.

22. The apparatus of claim 17, wherein the transmitter is configured to transmit the TPC command via at least one of a control channel message requesting an uplink reference signal transmission, a downlink grant, or an uplink grant.

23. The apparatus of claim 17, wherein the TPC command indicates at least one of:

an absolute transmit power level of one or more of: an uplink reference signal, a physical uplink control channel (PUCCH), or a physical uplink shared channel (PUSCH), how much one or more of a transmit power of the uplink reference signal, a transmit power of the PUCCH, or a transmit power of the PUSCH is to be adjusted, one or more a relative transmit power level of the PUCCH or the PUCCH with respect to the uplink reference signal, or how much a relative transmit power level of one or more of the PUCCH or the PUSCH is to be adjusted with respect to the uplink reference signal.

24. An apparatus for power control at a user equipment (UE), comprising:

A receiver configured to:

receive signaling, from at least one of a set of base stations serving a plurality of paired UEs using a common set of time/frequency resources, indicating whether the UE is to apply a transmit power control (TPC) command to uplink reference signals, a physical uplink shared channel (PUSCH), or a combination thereof; and receive the TPC command from one or more of the set of base stations wherein the TPC command is based at least in part on received power levels associated with transmissions from one or more other UEs in the plurality of paired UEs served by the set of base stations using the common set of time/frequency resources; and a processing system configured to:

apply the TPC command to an uplink transmission in accordance with the signaling.

25. The apparatus of claim 24, wherein the TPC command indicates:

an absolute transmit power level of one or more of the uplink reference signals, a physical uplink control channel (PUCCH), or the PUSCH, how much one or more of a transmit power of the uplink reference signals, a transmit power of the PUCCH, or a transmit power of the PUSCH is to be adjusted, one or more of a relative transmit power level of a physical uplink channel or the PUCCH with respect to the uplink reference signals, or how much a relative transmit power level of one or more of: the PUCCH, or the PUSCH is to be adjusted with respect to the uplink reference signals.

26. An apparatus for power control at a base station, comprising:

a processing system configured to:

identify a plurality of paired UEs served by a set of base stations on a common set of time/frequency resources; and generate a transmit power control (TPC) command for at least one UE in the plurality of paired UEs, wherein the TPC command is based at least in part on received power levels associated with transmissions from one or more other UEs in the plurality of paired UEs served by the set of base stations;

a transmitter configured to:

transmit the TPC command to the at least one UE via a physical downlink shared channel (PDSCH); and wherein the processing system is configured to:

monitor a physical uplink control channel (PUCCH) for an acknowledgement of the TPC command.

27. The apparatus of claim 26 wherein the processing system is configured to:

generate subsequent TPC commands for the plurality of paired UEs based on whether or not the acknowledgement is received.

28. The apparatus of claim 26, wherein the set of base stations jointly transmit to the plurality of paired UEs using the common set of time/frequency resources.

29. The apparatus of claim 26, wherein the processing system is configured to:

signal whether the TPC command is to be applied to one or more of uplink reference signals, the PUCCH, or a physical uplink shared channel (PUSCH).

30. The apparatus of claim 26, wherein the TPC command indicates:

an absolute transmit power level of one or more of an uplink reference signal, the PUCCH, or a physical uplink shared channel (PUSCH), how much one or more of a transmit power of the uplink reference signal, a transmit power of the PUCCH, or a transmit power of the PUSCH is to be adjusted, one or more of a relative transmit power level of the PUCCH or the PUCCH with respect to the uplink reference signal, or how much a relative transmit power level of one or more of the PUCCH or the PUSCH is to be adjusted with respect to the uplink reference signal.

* * * * *